US012668698B2

(12) United States Patent
Mennecke et al.

(10) Patent No.: US 12,668,698 B2
(45) Date of Patent: Jun. 30, 2026

(54) THERMALLY CONDUCTIVE CURABLE COMPOSITION

(71) Applicant: SIKA TECHNOLOGY AG, Baar (CH)

(72) Inventors: Klaas Mennecke, Lottstetten (DE); David Hofstetter, Winterthur (CH); Fabien Choffat, Rüttenen (CH)

(73) Assignee: SIKA TECHNOLOGY AG, Baar (CH)

( * ) Notice: Subject to any disclaimer, the term of this patent is extended or adjusted under 35 U.S.C. 154(b) by 708 days.

(21) Appl. No.: 17/419,256

(22) PCT Filed: Feb. 12, 2020

(86) PCT No.: PCT/EP2020/053659
§ 371 (c)(1),
(2) Date: Jun. 28, 2021

(87) PCT Pub. No.: WO2020/165288
PCT Pub. Date: Aug. 20, 2020

(65) Prior Publication Data

US 2022/0073738 A1 Mar. 10, 2022

(30) Foreign Application Priority Data

Feb. 13, 2019 (EP) .................................... 19156985

(51) Int. Cl.

| | |
|---|---|
| ***C08L 71/02*** | (2006.01) |
| ***C08K 3/013*** | (2018.01) |
| ***C08K 5/00*** | (2006.01) |
| ***C08K 5/549*** | (2006.01) |

(52) U.S. Cl.
CPC .............. *C08L 71/02* (2013.01); *C08K 3/013* (2018.01); *C08K 5/0016* (2013.01); *C08K 5/549* (2013.01); *C08L 2203/20* (2013.01)

(58) Field of Classification Search
CPC ..... C08L 71/02; C08L 2203/20; C08K 3/013; C08K 5/0016; C08K 5/549; C08K 5/521; C08K 2003/0806; C08K 2003/085; C08K 2003/2296; C08K 2003/282; C08K 3/22; C08K 3/04; C08K 3/34; C08K 5/5419; C08K 2003/0812; C08K 2003/2227; C08K 2003/265; C08K 2003/385
See application file for complete search history.

(56) References Cited

U.S. PATENT DOCUMENTS 10,308,838 B2 * 6/2019 Gubbels ..................... C09J 5/00
10,729,806 B2 * 8/2020 Bingol ................ A61L 24/0089
2008/0312369 A1 12/2008 Beers et al.
2009/0124751 A1 * 5/2009 Lucas .................. C09D 175/04 524/588
2010/0247929 A1 * 9/2010 Oertli ...................... C08L 75/12 156/329
2014/0316059 A1 * 10/2014 Dinkar ..................... C08K 3/36 524/588
2015/0031806 A1 * 1/2015 Lim ........................ C08L 75/04 524/266
2015/0079296 A1 3/2015 Pusel et al.
2015/0166708 A1 * 6/2015 Alam .................... C08F 255/02 525/106
2015/0166859 A1 * 6/2015 Choffat .................. C08G 18/10 524/436
2017/0009113 A1 * 1/2017 Itano ........................ C09J 11/04
2017/0044408 A1 * 2/2017 Elgimiabi ............... B32B 15/04
2019/0194509 A1 * 6/2019 True ....................... C09J 183/12

FOREIGN PATENT DOCUMENTS

| | | | |
|---|---|---|---|
| CN | 103214853 | A | 7/2013 |
| CN | 104428333 | A | 3/2015 |
| JP | 2006274094 | A | 10/2006 |
| JP | 2014-24958 | A | 2/2014 |
| JP | 2015-13927 | A | 1/2015 |
| JP | WO2013/042638 | A1 | 3/2015 |
| WO | 2008/121360 | A1 | 10/2008 |
| WO | 2009064428 | A2 | 5/2009 |

OTHER PUBLICATIONS

Apr. 20, 2020 International Search Report issued in International Patent Application No. PCT/EP2020/053659.
Apr. 20, 2020 Written Opinion of the Internatinal Searching Authority issued in International Patent Application No. PCT/EP2020/053659.

* cited by examiner

*Primary Examiner* — Mark Eashoo
*Assistant Examiner* — Zhen Liu
(74) *Attorney, Agent, or Firm* — Oliff PLC

(57) ABSTRACT

A moisture-curable composition, including between 0.6 and 15.0 wt.-% of at least one organic polymer containing reactive silane groups, between 70 and 95 wt.-% of at least one filler, at least one dispersion additive, optionally at least one catalyst for the curing of silane-functional polymers and up to 10 wt.-% of at least one plasticizer, characterized in that said filler is selected from the list consisting of aluminium oxide, aluminium hydroxide, boron nitride, aluminium nitride, zinc oxide, silver, copper, aluminium, chalk, aluminosilicate, graphite, and any mixture of these fillers; with the proviso that the amount of chalk in the filler does not exceed 25 wt.-% of the total amount of filler. The moisture-curable composition shows excellent thermal conductivity and is particularly suitable as adhesive, gap filler, or sealant suitable for e-coat applications and battery bonding especially in electric automobile assembly.

14 Claims, No Drawings

THERMALLY CONDUCTIVE CURABLE COMPOSITION

TECHNICAL FIELD

The invention relates to curable compositions based on silane-functional polymers and their use as adhesives, sealants, or coatings.

STATE OF THE ART

Curable compositions based on polymers containing reactive silane groups play an important role in many industrial applications, for example as adhesives, sealants or coatings. Polymers containing reactive silane groups are in particular polydiorganosiloxanes, which are commonly referred to as "silicones" or "silicone rubbers", and organic polymers containing reactive silane groups, which are also referred to as "silane-functional polymers", "silane-modified polymers" (SMP) or "silane-terminated polymers" (STP). Compositions containing either of these polymers harden via crosslinking reactions of the reactive silane groups on the polymers, which hydrolyze under the influence of moisture, condense with one another as silanol groups and thus form a covalently bonded network and, macroscopically, a cured material. Both types of these polymers have distinct properties and advantages. For example, silicones possess excellent thermal stability while silane-functional organic polymers commonly have advantages regarding adhesive properties and compatibility with substrate materials.

With the increasing use of batteries and electronic equipment nowadays, the demand for suitable adhesives and sealants in contact with these electronic elements or devices has risen significantly. Especially in electric automobile assembly, large batteries and a multitude of electronic parts require large amounts of such sealants and adhesives that cover, seal, or bond electronics and batteries directly. A particular requirement for these adhesive and selant materials is a high heat conductivity, since batteries and electronics generate significant amounts of heat while operating that must be dissipated efficiently to prevent detrimental heat accumulation on the batteries and electronic parts.

This aspect has proven to be a severe problem for traditionally used curable compositions, e.g. based on silane-functional polymers. Commonly known such compositions possess a poor heat conductivity and rather act as thermal insulators than efficient heat conductors. There have been several attempts to formulate curable compositions with high heat conductivity. The current state of the art most commonly uses silicone-based compositions with special fillers.

These marketed compositions are curable and show adequate thermal conductivity. However, silicone-based compositions are notoriously difficult to paint or coat and this is a critical problem in the rather young electric automobile industry. Silicones are especially problematic for electrodeposition coating ("e-coat" or cathode-dipping) processes, which are a common and often indispensable process step in automotive manufacturing. Many automotive manufacturers strictly try to avoid silicones in their plants to prevent interference with their e-coat processes.

So far, commercially available thermally conductive compositions are mainly limited to silicones and thus have limited applicability in automotive, especially electric vehicle, manufacturing. Other proposed curable compositions, based on organic silane-functional polymers, do not interfere with the e-coat process, but so far did not prove to be suitable because of their limited thermal conductivity.

There is thus an increasing demand for a curable composition that is suitable for battery and electronics assembly and that possesses high thermal conductivity but at the same time does not interfere with coating or painting processes, in particular e-coat processes.

SUMMARY OF THE INVENTION

It is therefore an object of the present invention to provide a curable composition based on organic polymers containing reactive silane groups that exhibit high thermal conductivity, in particular of at least 2 W/mK according to ASTM D5470, and is suitable as gap-filler, sealant, or adhesive for batteries and electronic equipment.

The present invention achieves these objects with the features of independent claim 1.

The combination of between 0.6 and 15.0 wt.-%, based on the total composition, of at least one organic polymer containing reactive silane groups with between 70 and 95 wt.-%, based on the total composition, of at least one filler, the filler selected from the list consisting of aluminium oxide, aluminium hydroxide, boron nitride, aluminium nitride, zinc oxide, silver, copper, aluminium, chalk, aluminosilicate, graphite, and any mixture of these fillers, and a suitable dispersion additive, surprisingly enables the formulation of a curable material with high thermal conductivity that can be used together with e-coat processes and does not have the disadvantages of silicone-based products.

Further aspects of the invention are the subject of further independent claims. Particularly preferred embodiments of the invention are the subject of the dependent claims.

Ways of Executing the Invention

The present invention relates in a first aspect to a moisture-curable composition, comprising

- between 0.6 and 15.0 wt.-%, based on the total composition, of at least one organic polymer P containing reactive silane groups;
- between 70 and 95 wt.-%, based on the total composition, of at least one filler F;
- at least one dispersion additive D;
- optionally at least one catalyst for the curing of silane-functional polymers;
- up to 10 wt.-%, based on the total composition, of at least one plasticizer PL;
- characterized in that
- said filler F is selected from the list consisting of aluminium oxide, aluminium hydroxide, boron nitride, aluminium nitride, zinc oxide, silver, copper, aluminium, chalk, aluminosilicate, graphite, and any mixture of these fillers; with the proviso that the amount of chalk in the filler F does not exceed 25 wt.-% of the total amount of filler F.

In the present document, the term "reactive silane group" refers to a silyl group that is bonded to an organic radical and has one to three, especially two or three, hydrolyzable substituents or hydroxyl groups on the silicon atom. Particularly useful hydrolyzable substituents are alkoxy groups. These silane groups are also referred to as "alkoxysilane groups". Reactive silane groups may also be in partly or fully hydrolyzed form, for example as silanols. "Hydroxysilane", "isocyanatosilane", "aminosilane" and "mercaptosilane" refer respectively to organoalkoxysilanes having one or more hydroxyl, isocyanato, amino or mercapto groups on the organic radical in addition to the silane group.

"Organofunctional compound" refers to a compound that contains a functional group that is bound via a carbon atom. For example, "aminofunctional compound" is a compound having an aminoalkyl group.

"Primary amino group" refers to an $NH_2$ group that is bonded to an organic radical, and "secondary amino group" refers to an NH group that is bonded to two organic radicals which may also together be part of a ring, and "tertiary amino group" refers to an N group that is bonded to three organic radicals, two or three of which together may also be part of one or more rings. Accordingly, "primary aminosilanes" are aminosilanes comprising a primary amino group and "secondary aminosilanes" are aminosilanes comprising a secondary amino group. The latter also encompasses compounds having both a primary and a secondary amino group.

"Polyoxyalkylene radical" refers to a linear or branched hydrocarbyl radical which contains ether groups and contains more than two repeat units of the (O—R) type in succession, where R is a linear or branched alkylene radical, as for example from the polyaddition of ethylene oxide or 1,2-propylene oxide onto starter molecules having two active hydrogen atoms.

Substance names beginning with "poly", such as polyol or polyisocyanate, refer to substances containing, in a formal sense, two or more of the functional groups that occur in their name per molecule.

The term "organic polymer" encompasses a collective of macromolecules that are chemically homogeneous but differ in relation to degree of polymerization, molar mass and chain length, which has been prepared by a poly reaction (polymerization, polyaddition, polycondensation) and has a majority of carbon atoms in the polymer backbone, and reaction products of such a collective of macromolecules. Polymers having a polyorganosiloxane backbone (commonly referred to as "silicones") are not organic polymers in the context of the present document.

The term "polyether containing reactive silane groups" also encompasses organic polymers which contain silane groups and which, in addition to polyether units, may also contain urethane groups, urea groups or thiourethane groups. Such polyethers containing reactive silane groups may also be referred to as "polyurethanes containing reactive silane groups".

"Molecular weight" is understood in the present document to mean the molar mass (in grams per mole) of a molecule or part of a molecule, also referred to as "radical". The term "radical" is used in this document in a formal sense, meaning a molecular rest bound to an atom by a covalent bond, while the bond is formally "cut" to describe the molecular rest attached to it. Molecular weight of polymers is understood as the average molecular weight of their chain length distribution. "Average molecular weight" is understood herein to mean the number-average Mn of an oligomeric or polymeric mixture of molecules or radicals, which is typically determined by means of gel permeation chromatography (GPC) against polystyrene as standard.

"Weight percent" or "percentage by weight", and its abbreviation "wt.-%" refer to the weight percentage of a certain compound in a total composition, if not otherwise defined. The terms "weight" and "mass" are used interchangeably in this document and refer to the mass as a property of a physical body and commonly measured in kilograms (kg).

"Storage-stable" or "storable" refers to a substance or composition when it can be stored at room temperature in a suitable container over a prolonged period, typically at least 3 months up to 6 months or more, without any change in its application or use properties, especially in the viscosity and crosslinking rate, to a degree of relevance for the use thereof as a result of the storage.

"Room temperature" refers to a temperature of 23° C.

Thermal conductivity $\lambda$ is defined as ability of material to transmit heat and it is measured in watts per square metre ($W/m^2$) of surface area for a temperature gradient of 1 K per unit thickness of 1 m. Thermal conductivity of materials disclosed in this document are measured according to ASTM D5470-06.

All industrial standards and norms cited in this document refer to the respective edition in force on the time of filing of the first application of this invention, if not otherwise defined.

A dotted line in the formulae in this document in each case represents the bond between a substituent and the corresponding molecular radical.

The term "does not contain polydiorganosiloxanes" means that no such compounds have been added during formulation of the composition. If traces of such species are unknowingly and/or unavoidably present, for example stemming from the synthesis of the silane-functional polymer or due to condensation reactions of silane-functional diorganosilane compounds possibly present in the composition, these are not considered as polydiorganosiloxanes in the meaning of this term. In simpler words, the term "does not contain polydiorganosiloxanes" means that no silicone oils or reactive silicone polymers, in particular polydimethylsiloxanes, were added during formulation of the composition.

The composition according to the present invention comprises between 0.6 and 15.0 wt.-%, based on the total composition, of at least one organic polymer P containing reactive silane groups.

In preferred embodiments, the composition comprises less than 12.5 wt.-%, preferably less than 10 wt.-%, more preferably less than 7.5 wt.-%, more preferably less than 6 wt.-%, in particular less than 5 wt.-%, based on the total composition, of said polymer P containing reactive silane groups. A higher amount of polymer P generally leads to a cured product with better mechanical performance, such as resilience or elasticity. However, for certain applications, a ductile, pasty product is sufficient, if not even advantageous, since it can be removed more easily when the object bonded with the cured composition needs to be disassembled. Furthermore, the higher the amount of polymer P, the lower the thermal conductivity generally will be.

In the same or other preferred embodiments, the composition comprises at least 0.7 wt.-%, preferably at least 1.0 wt.-%, more preferably at least 1.5 wt.-%, in particular at least 1.7 wt.-%, based on the total composition, of said polymer P containing reactive silane groups. If the amount of polymer P is too low, the composition does not cure properly into a useful pasty product. Below 0.6 wt.-% of polymer P, the composition cannot be cured anymore. Therefore it is crucial to include at least 0.6 wt.-% of polymer P.

The organic polymer P containing reactive silane groups is in particular a polyurethane, polyolefin, polyester, polycarbonate, polyamide, poly(meth)acrylate or polyether or a mixed form of these polymers, each of which bears one or preferably more than one reactive silane group. The silane groups may be in pendant positions in the chain or in terminal positions and are bonded to the organic polymer via a carbon atom.

More preferably, the organic polymer P containing reactive silane groups is a polyolefin containing reactive silane groups or a polyurethane containing reactive silane groups or a polyether containing reactive silane groups or a mixed form of these polymers.

Most preferably, the organic polymer containing reactive silane groups is a polyether containing reactive silane groups.

The silane groups present in the organic polymer containing reactive silane groups are preferably alkoxysilane groups, especially alkoxysilane groups of the formula (VII)

(VI)

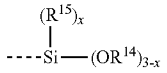

where $R^{14}$ is a linear or branched, monovalent hydrocarbyl radical having 1 to 5 carbon atoms, especially methyl or ethyl or isopropyl;

$R^{15}$ is a linear or branched, monovalent hydrocarbyl radical having 1 to 8 carbon atoms, especially methyl or ethyl; and x is a value of 0 or 1 or 2, preferably 0 or 1, especially 0.

More preferably $R^{14}$ is methyl or ethyl.

For particular applications, the $R^{14}$ radical is preferably an ethyl group, since, in this case, ecologically and toxicologically harmless ethanol is released in the course of curing of the composition.

Particular preference is given to trimethoxysilane groups, dimethoxymethyl-silane groups or triethoxysilane groups.

In this context, methoxysilane groups have the advantage that they are particularly reactive, and ethoxysilane groups have the advantage that they are toxicologically advantageous and particularly storage-stable.

The organic polymer containing reactive silane groups has an average of preferably 1.3 to 4, especially 1.5 to 3, more preferably 1.7 to 2.8, silane groups per molecule. The silane groups are preferably terminal.

The organic polymer containing reactive silane groups preferably has a average molecular weight, determined by means of GPC against a polystyrene standard, in the range from 1,000 to 30,000 g/mol, especially from 2,000 to 20,000 g/mol. The organic polymer containing reactive silane groups preferably has a silane equivalent weight of 300 to 25,000 g/eq, especially of 500 to 15,000 g/eq.

The organic polymer containing reactive silane groups may be solid or liquid at room temperature. It is preferably liquid at room temperature.

Most preferably, the organic polymer containing reactive silane groups is a polymer containing reactive silane groups that is liquid at room temperature, where the silane groups are especially dialkoxysilane groups and/or trialkoxysilane groups, more preferably trimethoxysilane groups, methyldimethoxysilane groups, or triethoxysilane groups.

Processes for preparing organic polymers containing reactive silane groups are known to the person skilled in the art.

In a preferred process, organic polymers containing reactive silane groups are obtainable from the reaction of organic polymers containing allyl groups with hydrosilanes, optionally with chain extension using, for example, diisocyanates.

In a further preferred process, polyethers containing reactive silane groups are obtainable from the copolymerization of alkylene oxides and epoxysilanes, optionally with chain extension using, for example, diisocyanates.

In a further preferred process, organic polymers containing reactive silane groups are obtainable from the reaction of organic polyols with isocyanatosilanes, optionally with chain extension using diisocyanates.

In a further preferred process, polyethers containing reactive silane groups are obtainable from the reaction of organic polymers containing isocyanate groups, especially NCO-terminated urethane polymers from the reaction of polyols with a superstoichiometric amount of polyisocyanates, with aminosilanes, hydroxysilanes or mercaptosilanes. This process enables the use of a multitude of inexpensive starting materials of good commercial availability, by means of which it is possible to obtain different polymer properties, for example high extensibility, high strength, low modulus of elasticity, low glass transition point or high weathering resistance.

In some preferred embodiments, the organic polymer P containing reactive silane groups is obtainable from the reaction of NCO-terminated urethane polyethers with aminosilanes or hydroxysilanes. Suitable NCO-terminated urethane polymers are obtainable from the reaction of polyols, especially polyether polyols, in particular polyoxyalkylenediols or polyoxyalkylenetriols, preferably polyoxypropylenediols or polyoxypropylenetriols, with a superstoichiometric amount of polyisocyanates, especially diisocyanates. Also other polyols, such as poly(meth)acrylate polyols, polyhydrocarbon polyols, in particular polybutadiene polyols, polyhdroxy functional fats or oils, polycarbonate polyols, polyester polyols and polyhydroxy functional acrylonitrilie/butadiene copolymers are suitable. Furthermore, small amounts of low molecular weight dihydric or polyhydric alcohols, such as diols, glycols, and sugar alcohols may be used as additives.

Preferably, the reaction between the polyisocyanate and the polyol is conducted with exclusion of moisture at a temperature of 50° C. to 160° C., optionally in the presence of suitable catalysts, with metered addition of the polyisocyanate in such a way that the isocyanate groups thereof are present in a stoichiometric excess in relation to the hydroxyl groups of the polyol. More particularly, the excess of polyisocyanate is chosen such that a content of free isocyanate groups of 0.1% to 5% by weight, preferably 0.2% to 4% by weight, more preferably 0.3% to 3% by weight, based on the overall polymer, remains in the resulting urethane polymer after the reaction of all hydroxyl groups.

Preferred diisocyanates are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI) and diphenylmethane 4,4'-, 2,4'- and 2,2'-diisocyanate and any desired mixtures of these isomers (MDI). Particular preference is given to IPDI or TDI. Most preferred is IPDI. In this way, polyethers containing reactive silane groups with particularly good lightfastness are obtained.

Especially suitable as polyether polyols are polyoxyalkylenediols or polyoxyalkylenetriols having a degree of unsaturation lower than 0.02 meq/g, especially lower than 0.01 meq/g, and a mean molecular weight in the range from 400 to 25,000 g/mol, especially 1000 to 20,000 g/mol. As well as polyether polyols, it is also possible to use portions of other polyols, especially polyacrylate polyols, and low molecular weight diols or triols.

Suitable aminosilanes for the reaction with an NCO-terminated urethane polyether are primary and secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary amino-silanes such as 3-aminopropyltrimethoxysilane, 3-aminopropyldimethoxy-methylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the aminosilanes mentioned with ethoxy or isopropoxy groups in place of the methoxy groups bonded to the silicon atom.

Suitable hydroxysilanes for the reaction with an NCO-terminated urethane polyether are especially obtainable from the addition of aminosilanes onto lactones or onto cyclic carbonates or onto lactides.

Aminosilanes suitable for the purpose are especially 3-aminopropyltrimeth-oxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-amino-3,3-dimethylbutyltriethoxysilane, 2-aminoethyltrimethoxysilane or 2-aminoethyltriethoxysilane. Particular preference is given to 3-aminopropyltrimethoxysilane, 3-aminopropyltriethoxysilane, 4-amino-3,3-dimethylbutyl-trimethoxysilane or 4-amino-3,3-dimethylbutyltriethoxysilane. Suitable lactones are especially γ-valerolactone, γ-octalactone, δ-decalactone, and ε-decalactone, especially γ-valerolactone.

Suitable cyclic carbonates are especially 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are especially 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide") and 3,6-diphenyl-1,4-dioxane-2,5-dione (lactide formed from mandelic acid).

Preferred hydroxysilanes which are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide and N-(3-triethoxysilylpropyl)-2-hydroxypropyl carbamate. In addition, suitable hydroxysilanes are also obtainable from the addition of aminosilanes onto epoxides or from the addition of amines onto epoxysilanes. Preferred hydroxysilanes which are obtained in this way are 2-morpholino-4(5)-(2-trimethoxysilylethyl)cyclohexan-1-ol, 2-morpholino-4(5)-(2-triethoxysilyl-ethyl)cyclohexan-1-ol or 1-morpholino-3-(3-(triethoxysilyl)propoxy)propan-2-ol.

Further suitable polyethers containing reactive silane groups are commercially available products, especially the following: MS Polymer™ (from Kaneka Corp.; especially the S203H, S303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Bayer MaterialScience AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61 LV, 77, 80, 81 products); Geniosil® (from Wacker Chemie AG; especially the STP-E10, STP-E15, STP-E30, STP-E35, WP1, and WP2 products).

Particularly preferred organic polymers containing reactive silane groups have end groups of the formula (VIII)

(VIII)

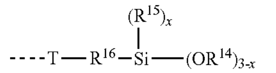

where $R^{16}$ is a linear or branched divalent hydrocarbyl radical which has 1 to 12 carbon atoms and optionally has cyclic and/or aromatic moieties and optionally one or more heteroatoms, especially one or more nitrogen atoms;

T is a divalent radical selected from —O—, —S—, —N($R^{17}$)—, —O—CO—N($R^{17}$)—, —N($R^{17}$)—CO—O— and —N($R^{17}$)—CO—N($R^{17}$)—, where $R^{17}$ is a hydrogen radical or a linear or branched hydrocarbyl radical which has 1 to 20 carbon atoms and optionally has cyclic moieties, and which optionally has an alkoxysilane, ether or carboxylic ester group; and $R^{14}$, $R^{15}$ and x have the definitions already given.

Preferably, $R^{16}$ is methylene, 1,3-propylene or 1,4-butylene, where butylene may be substituted by one or two methyl groups.

In an especially preferred embodiment, $R^{16}$ is a methylene radical;

Preferably, T is a divalent radical selected from —O—, —S—, —N($R^{17}$)—, —O—CO—N($R^{17}$)—, —N($R^{17}$)—CO—O— and —N($R^{17}$)—CO—N($R^{17}$)—, where $R^{17}$ is a hydrogen radical or a linear or branched hydrocarbyl radical which has 1 to 20 carbon atoms and optionally has cyclic moieties;

$R^{14}$ is in particular a methyl or ethyl radical;

$R^{15}$ is preferably a methyl radical; and x is preferably 0 or 1.

The composition according to the present invention comprises up to 10 wt.-%, based on the total composition, of at least one plasticizer PL. The composition may be formulated without plastcizer, but it is preferred that small amounts of plasticizer are used for ease of compounding and resulting application and mechanical properties. Preferably, the composition comprises between 1 and 9 wt.-%, based on the total composition, of plasticizer PL, preferably between 2 and 8 wt.-%, more preferably between 3 and 6 wt.-%.

The plasticizer may be any of the plasticizers commonly used in compositions based on silane-functional polymers. These include, for example, carboxylic esters such as phthalates, especially dioctyl phthalate, bis(2-ethylhexyl) phthalate, bis(3-propylheptyl) phthalate, diisononyl phthalate or diisodecyl phthalate, diesters of ortho-cyclohexane-dicarboxylic acid, especially diisononyl 1,2-cyclohexanedicarboxylate, adipates, especially dioctyl adipate, bis(2-ethylhexyl) adipate, azelates, especially bis(2-ethylhexyl) azelate, sebacates, especially bis(2-ethylhexyl) sebacate or diisononyl sebacate, glycol ethers, glycol esters, organic phosphoric or sulfonic esters, sulfonamides, polybutenes, or fatty acid methyl or ethyl esters derived from natural fats or oils, also called “biodiesel”.

Furthermore suitable are polymeric plasticizers. These have the advantage of lower migration tendency into surrounding areas and lower contribution to VOC levels.

The term “polymeric plasticizer” herein means a polymeric additive that is liquid at room temperature and contains no hydrolyzable silane groups. In contrast to traditional plasticizers, such as phthalates, the polymeric plasticizers generally have a higher molecular weight.

Preferably, the polymeric plasticizer has an average molecular weight Mn of 500 to 12,000 g/mol, in particular 1,000 to 10,000 g/mol, more preferably 2,500 to 5,000 g/mol.

Suitable polymeric plasticizers include polyols, such as those suitable for the production of the organic polymers P mentioned there, as long as they are liduid at room temperature, and polyols where the OH-groups have been reacted to chemically inert functional groups. Preferred polyols suitable as polymeric plasticizers include polyether polyols, polyester polyols, polyhydrocarbon polyols, polybutadiene polyols, and poly(meth)acrylate polyols. Particularly preferred are polyether polyols, especially those with an average molecular weight of Mn of 500 to 12,000 g/mol, especially 1,000 to 10,000 g/mol, more preferably 2,500 to 5,000 g/mol.

Most preferred plasticizers PL for the moisture-curable composition according to the present invention comprise or consist of a trialkyl and/or triaryl phosphate, for example triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates. Preferred trialkyl and/or triaryl phosphate plasticizers PL are tris-(2-ethylhexyl)-phosphate (sold under the trade name Disflamoll® TOF by Lanxess), cresyl diphenyl phosphate, tricresyl phosphate, and triphenyl phosphate (all sold under the trade name range Disflamoll® by Lanxess). Trialkyl and/or triaryl phosphate plasticizers have the advantage that they improve the flame-retardant properties of the composition. Most preferred plasticizer is tris-(2-ethylhexyl)-phosphate.

The composition furthermore optionally comprises at least one catalyst for the curing of silane-functional polymers. The addition of catalyst is advantageous to ensure a sufficient curing rate given the fact that low amounts of reactive polymers are used. However, a catalyst is not in every case necessary. In particular when using a highly reactive polymer P, for example one with a methylene group between the reactive silane group and the organic linker group ($R^{16}$=methylene in Formula (VIII)), a catalyst may be omitted. Suitable catalysts are especially metal compounds and/or basic nitrogen or phosphorus compounds.

Suitable metal compounds are especially compounds of tin, titanium, zirconium, aluminum or zinc, especially diorganotin(IV) compounds such as, in particular, dibutyltin(IV) diacetate, dibutyltin(IV) dilaurate, dibutyltin(IV) dineodecanoate or dibutyltin(IV) bis(acetylacetonate) and dioctyltin (IV) dilaurate, and also titanium(IV) or zirconium(IV) or aluminum(III) or zinc(II) complexes, especially with alkoxy, carboxylate, 1,3-diketonate, 1,3-ketoesterate or 1,3-ketoamidate ligands.

Suitable basic nitrogen or phosphorus compounds are especially imidazoles, pyridines, phosphazene bases, secondary or tertiary amines, hexahydrotriazines, biguanides, guanidines, or amidines.

Nitrogen-containing compounds suitable as catalysts are in particular amines, especially N-ethyl-diisopropylamine, N,N,N',N'-tetramethylalkylenediamines, 1,4-diazabicyclo [2.2.2]octane; amidines such as especially 1,8-diazabicyclo [5.4.0]undec-7-ene (DBU), 1,5-diazabicyclo[4.3.0]non-5-ene (DBN), 6-dibutylamino1,8-diazabicyclo-[5.4.0]undec-7-ene; guanidines such as especially tetramethylguanidine, 2-guanidino-benzimidazole, acetylacetone-guanidine, 3-di-o-tolyl-guanidine, 2-tert-butyl-1,1,3,3-tetramethyl guanidine; and imidazoles, in particular N-(3-trimethoxysilylpropyl)-4,5-dihydroimidazole and N-(3-triethoxysilylpropyl)-4,5-dihydroimidazole.

The composition according to the present invention comprises between 70 and 95 wt.-%, based on the total composition, of at least one filler F.

Said filler F is selected from the list consisting of aluminium oxide, aluminium hydroxide, boron nitride, aluminium nitride, zinc oxide, silver, copper, aluminium, chalk, especially natural, ground or precipitated calcium carbonates, optionally coated with fatty acids, especially stearic acid, aluminosilicate, graphite, and any mixture of these fillers, with the proviso that the amount of chalk in the filler F, if present at all, does not exceed 25 wt.-% of the total amount of filler F.

Preferred fillers F are selected from the list consisting of aluminium oxide, aluminium hydroxide, boron nitride, aluminium nitride, zinc oxide, aluminosilicate, graphite, and any mixture of these fillers. Preferably, filler F comprises less than 15 wt.-% of chalk, based on the total weight of filler F, in particular less than 10 wt.-% of chalk, more preferably no chalk at all.

The filler F should be in powder form or at least particulate, in order to ensure homogeneous compounding in its high amounts.

Perferably, the composition comprises more than 75 wt.-%, preferably more than 80 wt.-%, in particular more than 85 wt.-%, based on the total composition, of said filler F.

In preferred embodiments of the moisture-curable composition according to present invention, the filler F comprises or consists of aluminium oxide and aluminium hydroxide. This combination has the advantage that it shows especially good thermal conductivity and at the same time excellent flame-retardant properties. This makes it especially suitable for battery assemblies.

It is preferred to use more than one type of filler F, for example aluminium oxide and aluminium hydroxide, with different particle sizes. For example, it is advantageous to use a bimodal or multimodal particle size range for the employed fillers. When at least one filler with relatively large particles and at least another one with relatively small particles are used together, a higher density of close-packing of spheres may be achieved, which is beneficial for heat conductivity and compounding when using small amounts of reactive polymer P and high amounts of filler F.

The moisture-curable composition furthermore comprises at least one dispersion additive D. Dispersion additives are well known in the field of coating formulations containing fillers and pigments. They are also known as dispersants or wetting agents and facilitate the compounding of solids into a liquid matrix. In principle all common dispersion additives are suitable, and their suitable amount for a given formulation depends on the type of dispersion additive and relative amount of filler F and other consituents, such as polymer P.

In preferred embodiments, the composition comprises said dispersion additive D with an amount of between 0.5 and 5.0 wt.-%, preferably between 0.7 and 4.0 wt.-%, in particular between 1.0 and 3.0 wt.-%, based on the total composition.

An especially preferred dispersion additive D is an ammonium salt or alkyl ammonium salt of a polymer or compolymer containing carboxylate and/or phosphate groups, preferably a polyether and/or polyester polymer containing carboxylate and/or phosphate groups.

Suitable such dispersion additives D are, for example, Byk-W 996, Byk-W 969, Byk-W 985 (available from Altana) and Disparlon DA-234, DA-325, and DA-375 (available from King Industries).

The moisture-curable composition according to the present invention furthermore preferably comprises between 0.1 and 2.5 wt.-%, based on the total composition, organosilanes or oligomers of organosilanes, in particular monomeric or oligomeric organofunctional alkoxysilanes.

Organosilanes have various advantages. For example, they may act as desciccant or drying agent, in particular vinyl trimethoxysilane.

Other organosilanes have co-catalytic activity, in particular aminosilanes such as 3-aminopropyl trimethoxysilane, and/or they act as adhesion promotors, such as 3-glycidoxypropyl trimethoxysilane. Nevertheless, in some embodiments the composition does not contain adhesion-promoting silanes, such as amino silanes or glycidoxy silanes. A composition free of adhesion-promoting silanes, in particular amino-functional and/or glycidoxy-functional silanes, has the advantage that the composition may be easily removed from the substrate when the object bonded with the composition needs to be disassembled, for example during a battery replacement operation.

Preferred organosilanes acting, for example, as adhesion promoters and/or crosslinkers are in particular aminosilanes, mercaptosilanes, epoxysilanes, (meth)acryloylsilanes, anhydridosilanes, carbamatosilanes, alkylsilanes or iminosilanes, oligomeric forms of these silanes, adducts formed from primary aminosilanes with epoxysilanes or (meth)acryloylsilanes or anhydridosilanes, amino-functional alkylsilsesquioxanes, 3-glycidoxypropyltrimethoxysilane, 3-glycidoxypropyltriethoxysilane or 3-ureidopropyltrimethoxysilane, or oligomeric forms of these silanes.

Preferred organosilanes acting as desiccants or drying agents are in particular tetraethoxysilane, vinyltrimethoxysilane, vinyltriethoxysilane or organoalkoxysilanes having a functional group in the α-position to the silane group, especially N-(methyldimethoxysilylmethyl)-O-methylcarbamate, (methacryloyloxymethyl)silanes, and methoxymethylsilanes.

Preferred organosilanes acting as co-catalysts are in particular aminosilanes.

The organosilanes preferably comprised in the composition may be monomeric organosilanes or oligomeric organosilanes.

Examples of suitable monomeric organosilanes are shown in formula (II), (II)

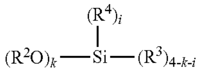

where $R^2$ is a monovalent alkyl radical having 1 to 6 carbon atoms, preferably 1 or 2 carbon atoms, most preferably a methyl radical;

$R^3$ is a monovalent, linear or branched hydrocarbon radical having 1 to 20 carbon atoms and optionally containing olefinic, aromatic and/or cyclic moieties and optionally containing heteroatoms selected from O, N, S, and Si;

$R^4$ is is a monovalent linear, branched, or cyclic alkyl or arakyl radical having 1 to 12 carbon atoms, preferably 1 to 8 carbon atoms, most preferably a methyl radical;

index i is an integer with a value of 0 or 1, preferably 0;

index k is an integer with a value of 2 or 3, with the provisio that if i=1 then k=2.

In preferred embodiments, $R^3$ is an aminoalkyl radical selected from $—C_pH_{2p}—NH_2$, $—C_pH_{2p}—NH—R^5$, $—C_pH_{2p}—NH—C_dH_{2d}—NH_2$, $—C_pH_{2p}—NH—C_dH_{2d}—NH—C_eH_{2e}—NH_2$, $—C_pH_{2p}—NH—C_dH_{2d}—NH—R^5$, and $—C_pH_{2p}—NH—C_dH_{2d}—NH—C_eH_{2e}—NH—R^5$;

where $R^5$ is a monovalent linear, branched, or cyclic alkyl or arakyl radical having 1 to 12 carbon atoms, preferably 1 to 6 carbon atoms;

index p is an integer with a value of 1 to 6;

indices d and e are independently integers with a value of 2 to 6.

In other preferred embodiments, $R^3$ is a glycidoxyalkyl radical.

In further preferred embodiments, $R^3$ is a mercapto- or hydroxyalkyl radical.

Suitable oligomeric silanes are linear, cyclic, or branched oligomers of the aforementioned monomeric organosilanes. They may be oligomers of one or more than one type of organosilane.

One advantage of using oligomeric organosilanes is that lower VOC levels can be achieved when employing them in greater amounts compared to purely monomeric silanes.

Preferred monomeric or oligomeric aminofunctional alkoxysilanes include N-(n-Butyl)-3-aminopropyltrimethoxysilane, 3-aminopropyltrimethoxysilane, 3-aminopropyldimethoxymethyl-silane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl]ethylenediamine and oligomers obtained from the condensation of the mentioned aminosilanes, optionally oligomerized together with alkylalkoxysilanes, in particular methyltrimethoxysilane, ethyltrimethoxysilane, propyltrimethoxysilane, vinyltrimethoxysilane, n-butyltrimethoxysilane, isobutyltrimethoxysilane, phenyltrimethoxysilane, and octyltrimethoxysilane. Also preferred are monomeric or oligomeric or the analogs thereof with ethoxy in place of methoxy groups.

Preferred glycidoxyfunctional organosilanes are glycidoxypropyltrimethoxysilane and glycidoxypropyltriethoxysilane and oligomers containing glycidoxypropyl groups, stemming from monomeric glycidoxypropylalkxoysilanes condensated with the aforementioned organosilanes or with themselves.

Especially preferred organosilanes comprised in the composition are those of the formula (I)

(I)

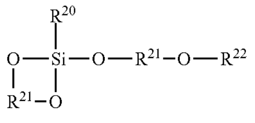

wherein $R^{20}$ independently stands for a monovalent, optionally cyclic or branched, hydrocarbyl or heterocarbyl radical, optionally comprising aromatic moieties, which contains 1 to 12 carbon atoms and wherein the carbon atom next to the silicon atom either bonds via a C═C double bond to another carbon atom or bonds to a heteroatom selected from O, N, and S;

$R^{21}$ independently stands for a linear, cyclic, or branched divalent hydrocarbyl radical having 2 to 12 carbon atoms and optionally containing cyclic and/or aromatic moieties; and $R^{22}$ stands for a hydrogen atom or a group of the formula (Ia).

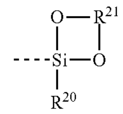

(Ia)

In preferred embodiments, each $R^{20}$ independently stands for a functional group selected from the group consisting of vinyl, phenyl, —$CH_2$—NH-cyclohexyl, —$CH_2$-methacrylate, and —$CH_2$—NH—(C═O)—O—$CH_3$.

Most preferably, $R^{20}$ is vinyl.

In the same or different preferred embodiments, each $R^{21}$ stands for a linear or branched divalent hydrocarbyl radical having 2 to 10 carbon atoms. Even more preferred, each $R^{21}$ independently is selected from the group consisting of ethanediyl, the isomers of propanediyl, the isomers of butanediyl, the isomers of pentanediyl, the isomers of hexanediyl, cyclohexanediyl, the isomers of heptanediyl, the isomers of octanediyl, and the isomers of nonanediyl. Particularly preferred are the isomers of pentanediyl, in particular 2,2-dimethylpropanediyl.

$R^{22}$ preferably stands for a group of the formula (Ia).

Suitable organosilanes according to formula (I) and their production are described in WO 2008/121360 A1. Suitable commercially available such organosilanes are, for example, CoatOSil* T-Cure (Momentive) and Silquest* Y-15866 (Momentive).

The organosilanes of formula (I) have the advantage that they significantly improve curing rate and behavior of the compositions according to the present invention. Furthermore, they do not possess distinctly adhesion-promoting properties when used alone without any adhesion-promoting silanes such as amino- or epoxysilanes, which is advantageous in embodiments where the cured composition needs to be easily removable from the substrate.

An additional surprising beneficial effect of organosilanes of formula (I) is that their use prevents the formation of bubbles in the cured composition after storage under warm conditions. It was found that after application as a gap filler on aluminum or e-coated aluminum subtrates (as used in battery boxes), the cured composition may show a tendency to form bubbles to a certain degree, if conventional monomeric organosilanes such as vinyl silanes are used. For oligomeric organosilanes, this effect was not observed.

In severe cases this bubble phenomenon may lead to decreased mechanical performance of the cured composition and it is asthetically displeasing. By using organosilanes of formula (I) as main organosilane additive or sole organosilane additive, the bubble formation can be effectively prevented.

For avoiding bubble formation in the cured composition, it is preferred that the composition contains less than 0.1 wt.-% of monomeric organosilanes not according to formula (I).

The composition may comprise further constituents, especially the following auxiliaries and additives:

- additional desiccants or drying agents, especially orthoformic esters, calcium oxide or molecular sieves;
- additional plasticizers, especially reactive plasticizers in the form of monofunctional organic polymers or silanes, i.e. those that are silane-reactive only at one end;
- solvents;
- further inorganic or organic fillers, especially baryte (heavy spar), talcs, quartz flours, quartz sand, dolomites, wollastonites, kaolins, calcined kaolins, mica (potassium aluminum silicate), molecular sieves, magnesium hydroxide, silicas including finely divided silicas from pyrolysis processes, industrially produced carbon blacks, metal powders such as iron or steel, PVC powder or hollow spheres;
- fibers, especially glass fibers, carbon fibers, metal fibers, ceramic fibers or polymer fibers such as polyamide fibers or polyethylene fibers;
- dyes;
- pigments, especially titanium dioxide or iron oxides;
- rheology modifiers, in particular thickeners or thixotropy additives, especially sheet silicates such as bentonites, derivatives of castor oil, hydrogenated castor oil, polyamides, polyurethanes, urea compounds, fumed (pyrogenic) silicas, cellulose ethers or hydrophobically modified polyoxyethylenes;
- stabilizers against oxidation, heat, light or UV radiation;
- natural resins, fats or oils such as rosin, shellac, linseed oil, castor oil or soya oil;
- non-reactive polymers that are preferably solid at room temperature such as, in particular, homo- or copolymers of unsaturated monomers, especially from the group comprising ethylene, propylene, butylene, isobutylene, isoprene, vinyl acetate or alkyl (meth) acrylates, especially polyethylenes (PE), polypropylenes (PP), polyisobutylenes, ethylene-vinyl acetate copolymers (EVA) or atactic poly-α-olefins (APAO);
- flame-retardant substances, especially the already mentioned filler aluminum hydroxide, magnesium hydroxide, or, in particular, the already mentioned organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris (chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis(diphenyl phosphate) or ammonium polyphosphates;
- surface-active substances, especially leveling agents, deaerating agents or defoamers;
- biocides, especially algicides, fungicides or substances that inhibit fungal growth;
- and other substances customarily used in curable compositions. It may be advisable to chemically or physically dry certain constituents before mixing them into the composition.

In preferred embodiments of the moisture-curable composition according to the invention, the composition does not contain polydiorganosiloxanes.

The composition is preferably produced and stored with exclusion of moisture.

Typically, it is storage-stable with exclusion of moisture in a suitable package or arrangement, such as, more particularly, a bottle, a canister, a pouch, a bucket, a vat or a cartridge.

The composition may take the form of a one-component or of a multi-component, especially two-component, composition.

In the present document, "one-component" refers to a composition in which all constituents of the composition are stored in a mixture in the same container and which is curable with moisture, in particular moisture from air humidity. In these cases, it is preferred that the fillers F are dried prior to formulating the composition in order to ensure sufficient storage stability.

In the present document, "two-component" refers to a composition in which the constituents of the composition are present in two different components which are stored in separate containers. Normally, the reactive species, i.e. polymer P and organosilane, are stored in the first component, and water is present in the second component. Only shortly before or during the application of the composition are the two components mixed with one another, whereupon the mixed composition cures under the action of moisture from air humidity and/or from the second component.

Any second or optionally further components is/are mixed with the first component prior to or on application, especially by means of a static mixer or by means of a dynamic mixer.

In the case of a two-component composition, it is still preferable to dry the filler F in the first component in order to ensure storage stability. The fillers of the second component, however, do not have this restriction.

Advantages of a one-component formulation include an easier application process for the user with no mixing steps involved and no risk of mixing errors.

Advantage of a two-component formulation include a generally higher storage stability, no requirement to dry the fillers F of the second component, and a faster, more homogeneous deep-curing behavior due to immediately present water within the mixture after mixing (no need for humidity to diffuse into the mixture).

In preferred embodiments of the moisture-curable composition according to the present invention, the composition therefore consists of two individual components A and B that are stored in separated containers and mixed before or during applications to yield the moisture-curable composition, wherein said component A contains polymer P and optionally organosilanes; said component B contains water; and all other consitutents of the composition may be present in either one or both of the components A and B.

An especially preferred embodiment of a two-component moisture-curable composition according to the present invention consists of a component A comprising, based on component A, between 1.2 and 9 wt.-%, preferably between 2 and 8 wt.-%, of said polymer P;

between 0.3 and 2.0 wt.-%, preferably between 0.5 and 1.8 wt.-%, of at least one organosilane or oligomers thereof;

between 4 and 10 wt.-% of said plasiticzer PL;

between 80 and 93 wt.-% of said at least one filler F;

between 1 and 3 wt.-% of said dispersion agent D;

and a component B, comprising, based on component B, between 3 and 10 wt.-% of said plasiticzer PL;

between 85 and 95 wt.-% of said at least one filler F;

between 0.5 and 3 wt.-% of said dispersion agent D;

between 0.5 and 2.5 wt.-% of water;

between 0 and 1.5 wt.-%, preferably between 0.1 and 1 wt.-% of said catalyst for the curing of silane-functional polymers.

A preferred volumetric mixing ratio of component A to component B for above two-component composition is between 1:2 and 2:1, preferably between 1:1.5 and 1.5:1, in particular between 1:1.2 and 1.2:1, most preferably 1:1.

The water mentioned for component B may be added accordingly, or it may be present from the beginning as impurity in not previously dried fillers F. Fillers F normally contain, if not dried, up to 1 wt.-% or more of water bound to their surface or within pores. This water is normally not chemically bound but only physisorbed and is able to promote the crosslinking of the polymers when the composition is mixed. Depending on the type and dryness of fillers F used, however, it may be advantageous to add water to component B, preferably in the above specified amounts.

All the preferred embodiments described for the individual consituents, e.g. polymer P or organosilane, of above two-component composition are the same as described in a more general manner further above in the description.

The curable composition according to the present invention is preferably applied at ambient temperature, such as room temperature, preferably within a temperature range between 0° C. and 45° C., especially 5° C. to 35° C., and cures under these conditions.

On application, the crosslinking reaction of the silane groups commences, if appropriate under the influence of moisture. Silane groups present can condense with silanol groups present to give siloxane groups (Si—O—Si groups).

Silane groups present can also be hydrolyzed on contact with moisture to give silanol groups (Si—OH groups) and form siloxane groups (Si—O—Si groups) through subsequent condensation reactions. As a result of these reactions, the composition ultimately cures. The catalysts described further above accelerate this curing mechanism catalytically.

If external water is required for the curing, especially in the case of one-component compositions, this can either come from the air (air humidity), or else the composition can be contacted with a water-containing component, for example by painting, for example with a smoothing agent, or by spraying, or water or a water-containing component can be added to the composition on application, for example in the form of a water-containing or water-releasing liquid or paste. A paste is especially suitable if the composition itself is in the form of a paste.

In the case of curing by means of air humidity, the composition cures from the outside inward, at first forming a skin on the surface of the composition. What is called the "skin time" or "skin formation time" is a measure of the curing rate of the composition. The speed of curing is generally determined by various factors, for example the availability of water (e.g., relative air humidity), temperature, etc.

The composition is in principle suitable for a multitude of uses, for example a molding, elastomer, film or membrane, as a potting compound, sealant, gap filler, adhesive, covering, or coating for construction and industrial applications, for example as a seam seal, cavity seal, electrical insulation compound, assembly adhesive, bodywork adhesive, seal, or gap filler. The composition is particularly suitable as an adhesive, gap filler, and/or sealant, especially in automotive manufacturing, for batteries, electronic elements, engine control units, anti-lock breaking and electronic stability control and safety systems, DC/DC converter of hybrid electric vehicles, advanced driver-assistance systems, sensors, or control units.

For an application as adhesive, gap filler, or sealant, the composition preferably has a pasty consistency with structurally viscous properties. Such a pasty sealant or adhesive is especially applied to a substrate from standard cartridges which are operated manually, by means of compressed air or with a battery, or from a vat or hobbock by means of a delivery pump or an extruder, optionally by means of an application robot.

On application, the composition is preferably applied to at least one substrate. Suitable substrates are especially

- glass, glass ceramic, concrete, mortar, brick, tile, gypsum and natural rocks such as limestone, granite or marble;
- metals and alloys such as aluminum, iron, steel and nonferrous metals, and also surface-finished metals and alloys such as galvanized or chromed metals or surface coated metals, such as Kynar®- or Duranar®-coated aluminum;
- leather, textiles, paper, wood, woodbase materials bonded with resins, for example phenolic, melamine or epoxy resins, resin-textile composites and further polymer composites;
- plastics such as polyvinyl chloride (rigid and flexible PVC), acrylonitrile-butadiene-styrene copolymers (ABS), polycarbonate (PC), polyamide (PA), polyesters, poly(methyl methacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), and also fiber-reinforced plastics such as carbon fiber-reinforced plastics (CFP), glass fiber-reinforced plastics (GFP) and sheet molding compounds (SMC), where the plastics may have been surface-treated by means of plasma, corona or flames;
- coated substrates such as powder-coated metals or alloys;
- electrocoated (e-coat) surfaces coated by electrophoretic painting processes;
- paints or varnishes, especially automotive topcoats.

If required, the substrates can be pretreated prior to the application of the composition, especially by chemical and/or physical cleaning methods or by the application of an adhesion promoter, an adhesion promoter solution or a primer.

In general, it is not required to pre-treat the surfaces prior to application of the composition. The composition shows in preferred embodiments an excellent adhesion profile on a large variety of unprimed, non-pretreated, and even uncleaned materials. In other preferred embodiments, the composition shows good adhesion, but can be easily removed by pulling. These compositions preferably do not contain adhesion promoting organosilanes as described further above.

It is possible to bond or seal two identical or two different substrates, especially the aforementioned substrates.

After the curing of the composition with water, especially in the form of air humidity, and/or with at least one suitable crosslinker, a cured composition is obtained.

The compositions disclosed herein possess excellent thermal conductivity, in particular of ≥2 W/mK, in preferred embodiments of ≥2.5 W/mK, according to ASTM D5470.

The compositions disclosed herein generally possess low viscosities of less than 1000 Pa s at a shear rate of 1 $s^{-1}$.

Furthermore, the compositions disclosed herein have the advantage of good compressibility, good sag resisitance and good flame retardant properties.

Another aspect of the present invention is the use of an adhesive composition as described herein to adhesively bond, coat, or seal substrates.

In preferred embodiments of said use, at least one of these substrates is a battery or an electric or electronic device or electronic element.

The use of the composition gives rise to an article that was bonded, sealed, or coated with the composition. The article is especially a built structure, especially a structure built by structural engineering or civil engineering, an industrially manufactured good or a consumable good, especially a domestic appliance or a mode of transport such as, more particularly, an automobile, a bus, a truck, a rail vehicle, a ship, an aircraft, a drone, or a helicopter; or the article may be an installable component thereof.

Another aspect of the present invention is thus a substrate, adhesively sealed, coated, or bonded by an adhesive composition described herein.

EXAMPLES

Adduced hereinafter are working examples which are intended to elucidate the invention described in detail. It will be appreciated that the invention is not restricted to these described working examples.

The term "standard climatic conditions" refers to a temperature of 23±1° C. and a relative air humidity of 50±5%.

Test Methods:

Viscosity was determined on a MCR 302 rheometer (Anton Paar) according to ISO 3219. Measurement parameters were: Rotation 0.1-10 s−1, measurement point at 10 s−1, temperature 20° C., gap 0.5 mm.

Thermal conductivity was determined according to ASTM D5470-12 on samples cured during 7 days under standard climatic conditions. For the measurements, a TIM (thermal interface material) testing device (Zentrum für Wärmemanagement, Stuttgart, Germany) using the stationary cylinder method was used. Sample dimensions were: Diameter 30 mm, thickness 2 mm. The pressure parameter of the measurements were 1, 2, 3, 5, 7, 10 bar.

Compounds Used:

TABLE 1

Compounds used for the example compositions.

| Name | Description, trade name |
|---|---|
| STP-E30 (polymer P) | Polyether polymer having dimethoxy(methyl)silylmethylcarbamate end groups (Geniosil ® STP-E30, Wacker) |
| STP-E10 (polymer P) | Polyether polymer having dimethoxy(methyl)silylmethylcarbamate end groups (Geniosil ® STP-E10, Wacker) |
| Organosilane 1 | Silane according to formula (I) with $R^{20}$ = vinyl, $R^{21}$ = 2,2-dimethylpropanediyl, and $R^{22}$ = group of formula (Ia) (Silquest ® Y-15866, Momentive) |
| Organosilane 2 | Vinyltrimethoxysilane (Silquest ® A-171, Momentive) |
| Apyral 20X (filler F) | Aluminium hydroxide ($Al(OH)_3$) (Apyral ® 20X, Nabaltec); |
| Apyral 1E (filler F) | Aluminium hydroxide ($Al(OH)_3$) (Apyral ® 1E, Nabaltec); |
| Martoxid TM 3310 (filler F) | Aluminium oxide ($\alpha$-$Al_2O_3$) (Martoxid ® TM 3310, Huber Martinswerk); |
| Omyacarb 40 GU (filler F) | Ground natural calcium carbonate (Omyacarb ® 40, Omya) |
| TOF (plasticizer PL) | Tris-(2-Ethylhexyl)-phosphate (Disflamoll ® TOF, Lanxess) |

TABLE 1-continued

| Compounds used for the example compositions. | |
|---|---|
| Name | Description, trade name |
| Byk-W 969 (dispersion agent D) | 30-50 wt.-% solution of a hydroxy-functional alkylammonium salt of an acidic copolymer in 2-phenoxyethanol (BYK-W 969, Altana) |
| Curing catalyst | 1,8-Diazabicyclo[5.4.0]undec-7-ene (DBU) (3 wt.-% in Hexamoll ® DINCH plasticizer) |
| Antioxidant | High molecular weight sterically hindered phenolic antioxidant (Irganox ® 1076, BASF) |
| Silica | Hydrophilic pyrogenic silica (Aerosil ® 200, Evonik) |

Compositions Based on Polymers Containing Reactive Silane Groups:

Comparative examples (not according to the present invention) are identified in Tables 2 to 6 by "(Ref.)".

A series of example two-component compositions was prepared by mixing the ingredients of each respective component A and B shown in Tables 2 and 5 (components A) and Tables 3 and 6 (components B) in the indicated sequence as listed in the table under nitrogen atmosphere in a vacuum mixer until homogeneous pastes were obtained. The individual components A and B were filled into internally coated aluminum spreading piston cartridges that were closed air-tight and stored under standard climate conditions for at least 24 h until the testing protocol (i.e. viscosity) was employed. For heat conductivity testing of the cured compositions, the respective components A and B of the compositions were mixed in a volume ratio of 1:1 and subsequently left for curing during 7 days under standard climate. The test results of these 1:1 mixtures are shown in Table 4 for selected compositions.

TABLE 2

| Example compositions components A (all numbers in wt.-%, based on the total individual composition A). | | | | | | | |
|---|---|---|---|---|---|---|---|
| Composition (components A) | C1-A | C2-A | C3-A | C4-A | C5-A (Ref.) | C6-A (Ref.) | C7-A (Ref.) |
| STP-E30 (polymer P) | 6 | 5 | 4 | 3.5 | 5 | 8 | 15 |
| Organosilane 1 | 0.5 | 1 | 1 | 1 | 0.5 | 0.5 | 0.5 |
| Apyral 20X (filler F) (dried) | 40 | 27 | 27 | — | — | — | — |
| Apyral 1E (filler F) (dried) | — | — | — | 15 | — | — | — |
| Martoxid TM 3310 (filler F) (dried) | 43 | 60 | 61 | 74 | — | — | — |
| Omyacarb 40 GU (filler F) (dried) | — | — | — | — | 85 | 80 | 70 |
| TOF (plasticizer PL) | 8.5 | 5 | 5 | 4.5 | 7.5 | 9.5 | 12.5 |
| Byk-W 969 (dispersion agent D) | 2 | 2 | 2 | 2 | 2 | 2 | 2 |

TABLE 3

| Example compositions components B (all numbers in wt.-%, based on the total individual composition B). | | | | | | | |
|---|---|---|---|---|---|---|---|
| Composition (components B) | C1-B | C2-B | C3-B | C4-B | C5-B (Ref.) | C6-B (Ref.) | C7-B (Ref.) |
| TOF (plasticizer PL) | 7 | 5 | 4 | 4 | 12.5 | 17.5 | 27.5 |
| Apyral 20X (filler F) | 40 | 31 | 32 | — | — | — | — |
| Apyral 1E (filler F) | — | — | — | 20.5 | — | — | — |
| Martoxid TM 3310 (filler F) | 49.7 | 60 | 60 | 72 | — | — | — |
| Omyacarb 40 GU (filler F) | — | — | — | — | 85 | 80 | 70 |
| Water | 1 | 1 | 1 | 1 | 1 | 1 | 1 |
| Byk-W 969 (dispersion agent D) | 2 | 2 | 2 | 2 | 2 | 2 | 2 |
| Curing catalyst | 0.3 | 1 | 1 | 0.5 | 0.5 | 0.5 | 0.5 |

TABLE 4

Testing results of the investigated samples.

| Test results compositions A + B (1:1 volume mixture) | C1-A + C1-B | C2-A + C2-B | C3-A + C3-B | C4-A + C4-B | C5-A + C5-B (Ref.) | C6-A + C6-B (Ref.) | C7-A + C7-B (Ref.) |
|---|---|---|---|---|---|---|---|
| Viscosity component A (1 $s^{-1}$) | n/m | 903 | 865 | 886 | n/m | n/m | n/m |
| Viscosity component B (1 $s^{-1}$) | n/m | 205 | 237 | 199 | n/m | n/m | n/m |
| Thermal conductivity (W/mK) | 2.23 | 2.6 | 2.9 | 2.95 | 1.02 | 0.84 | 0.57 |

"n/m" means not measured.

To investigate the lowest amount of polymer P required for proper curing, a series of low polymer P compositions was prepared with the method described above and using the ingredients and amounts detailed in Tables 5 and 6. The results of the hardening (curing) behavior are shown in Table 7.

TABLE 5

Example compositions components A (all numbers in wt.-%, based on the total individual composition A).

| Composition (components A) | C8-A | C9-A | C10-A | C11-A | C12-A | C13-A (Ref.) |
|---|---|---|---|---|---|---|
| STP-E10 (polymer P) | 2 | 1.8 | 1.6 | 1.4 | 1.2 | 1.0 |
| Organosilane 1 | 0.4 | 0.4 | 0.4 | 0.4 | 0.4 | 0.4 |
| Martoxid TM 3310 (filler F) (dried) | 60 | 60 | 60 | 60 | 60 | 60 |
| Apyral 1E (filler F) (dried) | 30.6 | 30.6 | 30.6 | 30.6 | 30.6 | 30.6 |
| TOF (plasticizer PL) | 6.0 | 6.2 | 6.4 | 6.6 | 6.8 | 7.0 |
| Byk-W 969 (dispersion agent D) | 1 | 1 | 1 | 1 | 1 | 1 |

TABLE 6

Example compositions components B (all numbers in wt.-%, based on the total individual composition B).

| Composition (components B) | C8-B | C9-B | C10-B | C11-B | C12-B | C13-B (Ref.) |
|---|---|---|---|---|---|---|
| TOF (plasticizer PL) | 6 | 6 | 6 | 6 | 6 | 6 |
| Byk-W 969 (dispersion agent D) | 1 | 1 | 1 | 1 | 1 | 1 |
| Martoxid TM 3310 (filler F) | 67.2 | 67.2 | 67.2 | 67.2 | 67.2 | 67.2 |
| Apyral 1E (filler F) | 25.5 | 25.5 | 25.5 | 25.5 | 25.5 | 25.5 |
| Silica | 0.3 | 0.3 | 0.3 | 0.3 | 0.3 | 0.3 |

All mixtures of Table 7 did cure into pasty, useful products, except the Reference example C13A+C13B. This did not fully cure and remained inhomogeneous and with poor cohesion.

TABLE 7

Results of curing behavior test of compositions based oin C8-A to C13-A and C8-B to C13-B mixed in a 1:1 volume ratio.

| Test results compositions A + B (1:1 volume mixture) | C8-A + C8-B | C9-A + C9-B | C10-A + C10-B | C11-A + C11-B | C12-A + C12-B | C13-A + C13-B (Ref.) |
|---|---|---|---|---|---|---|
| Curing behavior | OK | OK | OK | OK | OK | Not OK [1] |

[1] did not cure properly.

Additional experiments were done comparing different organosilanes. The compositions are shown in Tables 8 and 11 (A components) and Tables 9 and 12 (B components). Preparation and storage of the individual components was done as according to the procedure defined above for, e.g., the components A and B in Tables 2 and 3.

TABLE 8

Example compositions components A (all numbers in wt.-%, based on the total individual composition A).

| Composition (components A) | C14-A | C15-A | C16-A | C17-A | C18-A |
|---|---|---|---|---|---|
| STP-E10 (polymer P) | 2 | 2 | 2 | 2 | 2 |
| Organosilane 1 | 0.8 | 0.5 | 0.3 | — | — |
| Organosilane 2 | — | — | — | 0.8 | 0.5 |
| Martoxid TM 3310 (filler F) (dried) | 70 | 70 | 70 | 70 | 70 |
| Apyral 1E (filler F) (dried) | 20 | 20 | 20 | 20 | 20 |
| Antioxidant | 0.2 | 0.2 | 0.2 | 0.2 | 0.2 |
| TOF (plasticizer PL) | 6.0 | 6.3 | 6.5 | 6.6 | 6.8 |
| Byk-W 969 (dispersion agent D) | 1 | 1 | 1 | 1 | 1 |

TABLE 9

Example compositions components B (all numbers in wt.-%, based on the total individual composition B).

| Composition (components B) | C14-B | C15-B | C16-B | C17-B | C18-B |
|---|---|---|---|---|---|
| TOF (plasticizer PL) | 7 | 7 | 7 | 7 | 7 |
| Water | 0.5 | 0.5 | 0.5 | 0.5 | 0.5 |
| Byk-W 969 (dispersion agent D) | 1 | 1 | 1 | 1 | 1 |
| Apyral 1E (filler F) | 24.5 | 24.5 | 24.5 | 24.5 | 24.5 |
| Martoxid TM 3310 (filler F) | 67 | 67 | 67 | 67 | 67 |

These compositions of s Tables 8 and 11 (A components) and Tables 9 and 12 (B components) were mixed according to the weight mixing ratios and individual components as shown in Tables 10 and 13. In the latter Tables, the themal conductivity and the tack free time as measured by the methods defined above, as well as the bubble formation are shown.

The bubble formation was assessed by eye on samples that were cured first during 7 days at 23° C. and 50% r.h. and subsequently at 7 days in a 90° C. oven and then cooled to 23° C. and cut open. After curring open, the amount of bubbles visible to the eye was assessed by the following rating:

0=no visible bubbles
1=only very few bubbles visible
2=significant amount of bubbles visible
3=large amount of bubbles visible.

TABLE 10

Testing results of the investigated samples.

| Test results compositions A + B (100:103 weight/weight mixture) | C14-A + C14-B | C15-A + C15-B | C16-A + C16-B | C17-A + C17-B | C18-A + C18-B |
|---|---|---|---|---|---|
| Tack free time (h) | 6 | 4 | 3 | >10 | >10 |
| Bubble formation | 0 | 0 | 0 | 3 | 3 |
| Thermal conductivity (W/mK) | 2.9 | 2.9 | 2.9 | 2.9 | 2.9 |

"n/m" means not measured.

TABLE 11

Example compositions components A (all numbers in wt.-%, based on the total individual composition A).

| Composition (components A) | C19-A | C20-A | C21-A | C22-A | C23-A |
|---|---|---|---|---|---|
| STP-E10 (polymer P) | 2 | 2 | 2 | 2 | 2 |
| Organosilane 1 | — | 0.5 | 0.3 | 0.5 | 0.3 |
| Organosilane 2 | 0.3 | 0.1 | 0.1 | 0.2 | 0.2 |
| Martoxid TM 3310 (filler F) (dried) | 70 | 70 | 70 | 70 | 70 |
| Apyral 1E (filler F) (dried) | 20 | 20 | 20 | 20 | 20 |
| Antioxidant | 0.2 | 0.2 | 0.2 | 0.2 | 0.2 |
| TOF (plasticizer PL) | 6.5 | 6.2 | 6.4 | 6.1 | 6.3 |
| Byk-W 969 (dispersion agent D) | 1 | 1 | 1 | 1 | 1 |

TABLE 12

Example compositions components B (all numbers in wt.-%, based on the total individual composition B).

| Composition (components B) | C19-B | C20-B | C21-B | C22-B | C23-B |
|---|---|---|---|---|---|
| TOF (plasticizer PL) | 7 | 7 | 7 | 7 | 7 |
| Water | 0.5 | 0.5 | 0.5 | 0.5 | 0.5 |
| Byk-W 969 (dispersion agent D) | 1 | 1 | 1 | 1 | 1 |
| Apyral 1E (filler F) | 24.5 | 24.5 | 24.5 | 24.5 | 24.5 |
| Martoxid TM 3310 (filler F) | 67 | 67 | 67 | 67 | 67 |

TABLE 13

Testing results of the investigated samples.

| Test results compositions A + B (100:103 weight/weight mixture) | C19-A + C19-B | C20-A + C20-B | C21-A + C21-B | C22-A + C22-B | C23-A + C23-B |
|---|---|---|---|---|---|
| Tack free time (h) | 8 | 4 | 3 | 5 | 4 |
| Bubble formation | 2 | 0 | 0 | 1 | 1 |
| Thermal conductivity (W/mK) | 2.9 | 2.9 | 2.9 | 2.9 | 2.9 |

The invention claimed is:

1. A moisture-curable composition, consisting of two individual components A and B that are stored in separated containers and mixed before or during applications to yield the moisture-curable composition, wherein the component A comprises, based on component A:

between 1.2 and 9.0 wt.-% of at least one organic polymer P containing reactive silane groups, wherein the organic polymer P containing reactive silane groups is a polyurethane containing reactive silane groups or a polyether containing reactive silane groups or a mixed form of these polymers;

between 0.3 and 2.0 wt.-% of at least one organosilane or oligomers thereof;

between 80 and 93 wt.-% of at least one filler F;

between 1 and 3 wt.-% at least one dispersion additive D;

between 4 and 10 wt.-% of at least one plasticizer PL;

the component B comprises, based on component B, between 3 and 10 wt.-% of the plasticizer PL;

between 85 and 95 wt.-% of the at least one filler F;

between 1 and 3 wt.-% of the dispersion agent D;

between 0.5 and 2.5 wt.-% of water;

between 0 and 1.5 wt.-% of a catalyst for the curing of silane-functional polymers;

wherein the filler F is selected from the group consisting of aluminium oxide, aluminium hydroxide, boron nitride, aluminium nitride, zinc oxide, and any mixture of these fillers; with the proviso that the amount of chalk in the filler F does not exceed 25 wt.-% of the total amount of filler F; and wherein the composition does not contain polydiorganosiloxanes.

2. The moisture-curable composition as claimed in claim 1, wherein the filler F comprises aluminium oxide and aluminium hydroxide.

3. The moisture-curable composition as claimed in claim 1, wherein the dispersion additive D is an amine or ammonium salt of a polymer or copolymer containing carboxylate and/or phosphate groups.

4. The moisture-curable composition as claimed in claim 1, wherein the plasticizer PL comprises a trialkyl and/or triaryl phosphate.

5. The moisture-curable composition as claimed in claim 1, wherein the polymer P has end groups of the formula (VIII)

(VIII)

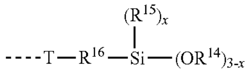

wherein $R^{16}$ is a linear or branched divalent hydrocarbyl radical having 1 to 12 carbon atoms;

T is a divalent radical selected from —O—, —S—, —$N(R^{17})$—, —O—CO—$N(R^{17})$—, —$N(R^{17})$—CO—O— and —$N(R^{17})$—CO—$N(R^{17})$—, where $R^{17}$ is a hydrogen radical or a linear or branched hydrocarbyl radical which has 1 to 20 carbon atoms;

$R^{14}$ is a methyl or ethyl radical;

$R^{15}$ is a methyl radical; and x is 0 or 1.

6. The moisture-curable composition as claimed in claim 1, wherein the organosilane comprises an organosilane of the formula (I)

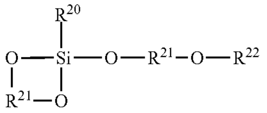

(I)

wherein $R^{20}$ independently stands for a monovalent hydrocarbyl or heterocarbyl radical, which contains 1 to 12 carbon atoms and wherein the carbon atom next to the silicon atom either bonds via a C═C double bond to another carbon atom or bonds to a heteroatom selected from O, N, and S;

$R^{21}$ independently stands for a linear, cyclic, or branched divalent hydrocarbyl radical having 2 to 12 carbon atoms; and $R^{22}$ stands for a hydrogen atom or a group of the formula (Ia)

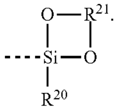

(Ia)

7. A method, comprising adhesively bonding, coating, or sealing substrates with the moisture curable composition according to claim 1.

8. The method according to claim 7, wherein at least one of the substrates is a battery or an electronic device.

9. The moisture-curable composition as claimed in claim 1, wherein the organic polymer P containing reactive silane groups is a polyether containing reactive silane groups.

10. The moisture curable composition as claimed in claim 1, wherein said composition possesses thermal conductivity of ≥2 W/mK measured according to ASTM D5470.

11. The moisture-curable composition as claimed in claim 1, wherein the organic polymer P containing reactive silane groups consists of a polyurethane containing reactive silane groups or a polyether containing reactive silane groups or a mixed form of these polymers.

12. The moisture-curable composition as claimed in claim 1, wherein the amount of chalk in the filler F does not exceed 15 wt.-% of the total amount of filler F.

13. The moisture-curable composition as claimed in claim 1, wherein the amount of chalk in the filler F does not exceed 10 wt.-% of the total amount of filler F.

14. The moisture-curable composition as claimed in claim 1, wherein no chalk is contained in the filler F.

* * * * *